United States Patent [19]

Sakamoto et al.

[11] Patent Number: 4,949,833
[45] Date of Patent: Aug. 21, 1990

[54] APPARATUS FOR SUCCESSIVE SUPPLY OF PARTS

[75] Inventors: Shunji Sakamoto; Tuyosi Watanabe, both of Higashihiroshima, Japan

[73] Assignee: Mazda Motor Corporation, Kanagawa, Japan

[21] Appl. No.: 233,216

[22] Filed: Aug. 16, 1988

[30] Foreign Application Priority Data

Aug. 18, 1987 [JP] Japan .................. 62-204337

[51] Int. Cl.$^5$ .............................. B65G 11/00
[52] U.S. Cl. .................. 198/358; 198/366; 198/369; 221/14; 221/21; 414/224
[58] Field of Search ............ 414/222, 224, 225; 198/358, 366, 369; 221/14, 21

[56] References Cited

U.S. PATENT DOCUMENTS

| | | | |
|---|---|---|---|
| 2,868,413 | 1/1959 | Vossen | 221/103 X |
| 3,071,262 | 1/1963 | Bosch et al. | 198/369 X |
| 3,122,231 | 2/1964 | Pence et al. | 198/358 X |
| 3,233,752 | 2/1966 | Lagler et al. | 414/224 X |
| 4,587,703 | 5/1986 | Azizi et al. | 414/225 X |

FOREIGN PATENT DOCUMENTS

0030581 3/1978 Japan .................. 198/358
60-119594 5/1985 Japan .

Primary Examiner—Robert J. Spar
Assistant Examiner—Donald W. Underwood
Attorney, Agent, or Firm—Sixbey, Friedman, Leedom & Ferguson

[57] ABSTRACT

An apparatus for successive supply of parts comprises a main parts feeding device for feeding parts successively to a predetermined position, a auxiliary parts feeding device provided with a parts storing portion and operative to supply parts kept in the parts storing portion in a selected situation, a checking device for checking a parts feeding condition of the main parts feeding portion, and a feeding control device operative to cause the auxiliary parts feeding device to feed the parts kept in the parts storing portion to the feeding control device when the checking device detects that the main parts feeding device fails to feed the parts to the predetermined position. The parts fed to the predetermined position and the parts fed to the feeding control device are supplied to a common destination through the feeding control device.

7 Claims, 9 Drawing Sheets

APPARATUS FOR SUCCESSIVE SUPPLY OF PARTS

BACKGROUND OF THE INVENTION

Field of the Invention

The present invention generally relates to an apparatus for successive supply of parts, and more particularly, is directed to improvements in a parts supplying apparatus for feeding successively relatively small parts, such as bolts or nuts used for mounting mechanical parts or components on a vehicle body, to a predetermined position from which, for example, the parts are carried to the vehicle body.

Description of the Prior Art

There has been proposed to automatize a vehicle assembly line arrangement for improving efficiency in production of vehicles. For putting automatization of the vehicle assembly line arrangement into practice, it is indispensably required to provide parts supplying apparatus for feeding automatically mechanical parts or components which are to be mounted on a vehicle body and clamping parts, such as bolts and nuts, used for fixing the mechanical parts or components to the vehicle body to various mounting stations in the vehicle assembly line arrangement.

One of the parts supplying apparatus as mentioned above, which is used for feeding relatively small parts, such as buttons to a predetermined parts gateway, is disclosed in the Japanese patent application published before examination under publication number 61-277511. In such a parts supplying apparatus as disclosed in the prior publication, a bowl structure provided on the inside thereof with a spiral guide way for guiding parts and disposed to hold the parts therein and a shooting passage disposed to interconnect therethrough the bowl structure with the parts gateway are used, and the bowl structure is vibrated for causing the parts held therein to orient to a predetermined direction on the spiral guide way and forwarding the parts caused to orient to the predetermined direction through the shooting passage to the parts gateway. The parts carried to the gateway are further transmitted by, for example, a robot to a predetermined position at which the parts are subjected to attachment or mounting. That is, if the parts are bolts for fixing mechanical components to a vehicle body, each of the bolts carried from the parts gateway is screwed through the mechanical component into the vehicle body by a screw driver or wrench.

In the case of the previously proposed parts supplying apparatus mentioned above, however, an inoperative situation in which the shooting passage is clogged with the parts which are not caused to orient properly in the shooting passage or caused to stick on the shooting passage due to friction between the parts and the shooting passage and thereby the parts are not carried to the parts gateway, arises not infrequently, and occurrence of such an undesirable situation is practically unavoidable. When the vehicle assembly line arrangement is equipped with such previously proposed parts supplying apparatus, a failure rate of the vehicle assembly line arrangement is dependent mainly upon a failure rate of each of the parts supplying apparatus and it is usual that the failure rate of each of the parts supplying apparatus determines the failure rate of the vehicle assembly line arrangement. Therefore, in the case where a plurality of parts supporting apparatus proposed previously are employed in the vehicle assembly line arrangement, it is feared that the failure rate of the vehicle assembly line arrangement is increased to a relatively large value obtained by multiplying the respective failure rates of the parts supplying apparatus.

Consequently, the parts supplying apparatus proposed previously may be excluded from a main portion of the vehicle assembly line arrangement which exerts a great harmful influence on other portions of the vehicle assembly line arrangement when the parts are stopped to be fed to the main portion and therefore the mechanical components are not mounted on the vehicle body at the main portion. By way of example, in a nut welding station at the main portion of the vehicle assembly line, in which nuts are welded on a vehicle body, it is required for a worker to confirm with his eye that each nut is fed to a welding device by a nut feeder which supplies the nut individually to be surely held by the welding device and then to have the welding device operate, so that the nut welding operation is carried out not automatically but semi-automatically and therefore efficiency in production of vehicle bodies cannot be improved.

OBJECTS AND SUMMARY OF THE INVENTION

Accordingly, it is an object of the present invention to provide an apparatus for successive supply of parts, which avoids the foregoing problem or disadvantage encountered with the prior art.

Another object of the present invention is to provide an apparatus for successive supply of parts, which can feed relatively small parts, such as bolts or nuts used for mounting mechanical components on a vehicle body, successively to a predetermined portion with a reduced failure rate.

A further object of the present invention is to provide an apparatus for successive supply of parts, which can be employed for feeding relatively small parts, such as bolts or nuts used for mounting mechanical components on a vehicle body, successively to a main portion of a product assembly line arrangement.

According to the present invention, there is provided an apparatus for successive supply of parts, which comprises a main parts feeding device for feeding parts successively to a predetermined position, an auxiliary parts feeding device provided with a parts storing portion and operative to supply parts kept in the parts storing portion in a selected situation, a checking device for checking a parts feeding condition of the main parts feeding portion, and a feeding control device operative to cause the auxiliary parts feeding device to feed the parts kept in the parts storing portion of the auxiliary parts feeding device to the feeding control device when the checking device detects that the main parts feeding device fails to feed the parts to the predetermined position.

In the apparatus thus constituted in accordance with the present invention, the main parts feeding device feeds the parts successively, for example, to a parts gateway provided to engage with the main parts feeding device and the auxiliary parts feeding device is kept inoperative in a normal operating state and the parts feeding condition of the main parts feeding device is kept under the check by the checking device. Then, when failure in feeding of parts by the main parts feeding device is detected by the checking device, the auxiliary parts feeding device is caused by the feeding control device to supply the parts kept in the parts storing portion, in place of the main parts feeding device, so that the parts from the auxiliary parts feeding device are fed to the parts gateway. Consequently, the parts are supplied to a predetermined destination without interruption even when the main parts feeding device has gone wrong due to some cause.

The above, and other objects, features and advantages of the present invention will become apparent from the following detailed description which is to be read in conjunction with the accompanying drawings.

DESCRIPTION OF THE PREFERRED EMBODIMENTS

Now, the invention will now be described by way of example with reference to the accompanying drawings.

Figure 1:
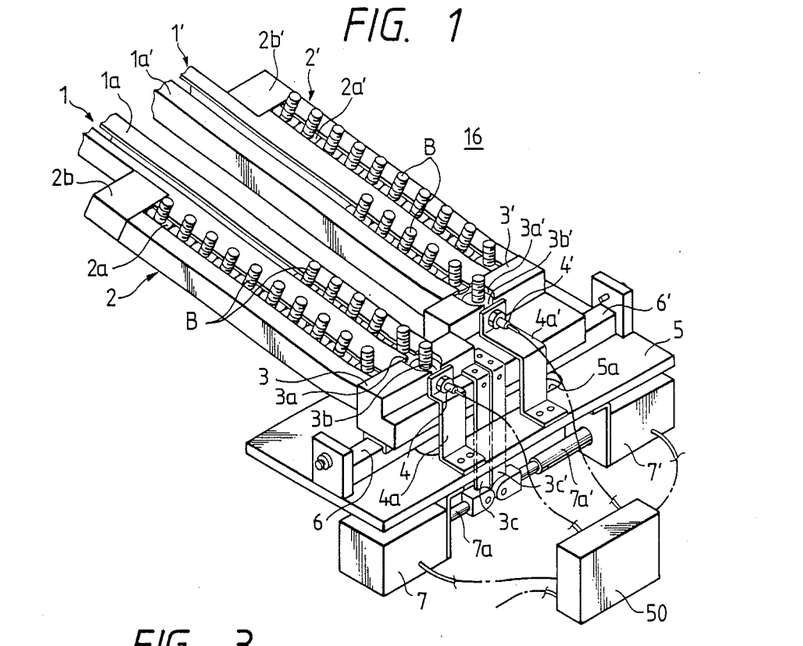
FIG. 1 is a schematic perspective view showing one embodiment of apparatus for successive supply of parts according to the present invention.
Figure 2:
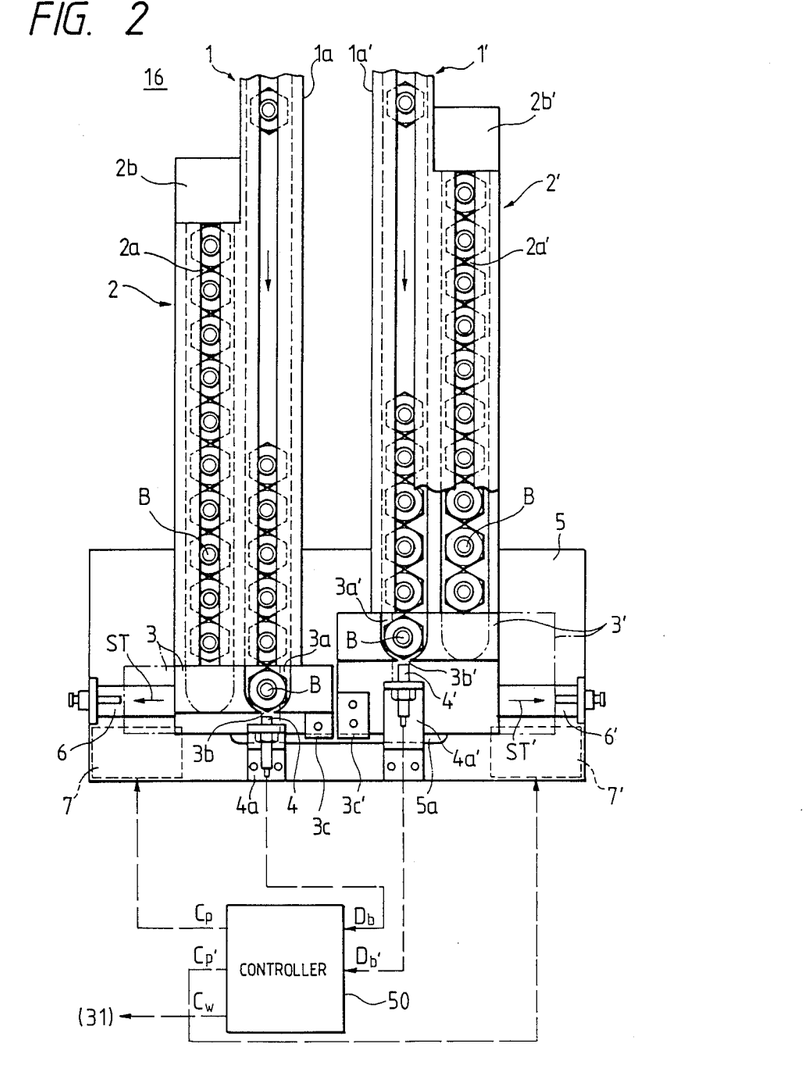
FIG. 2 is a schematic plan view showing the embodiment of FIG. 1.
Figure 5:
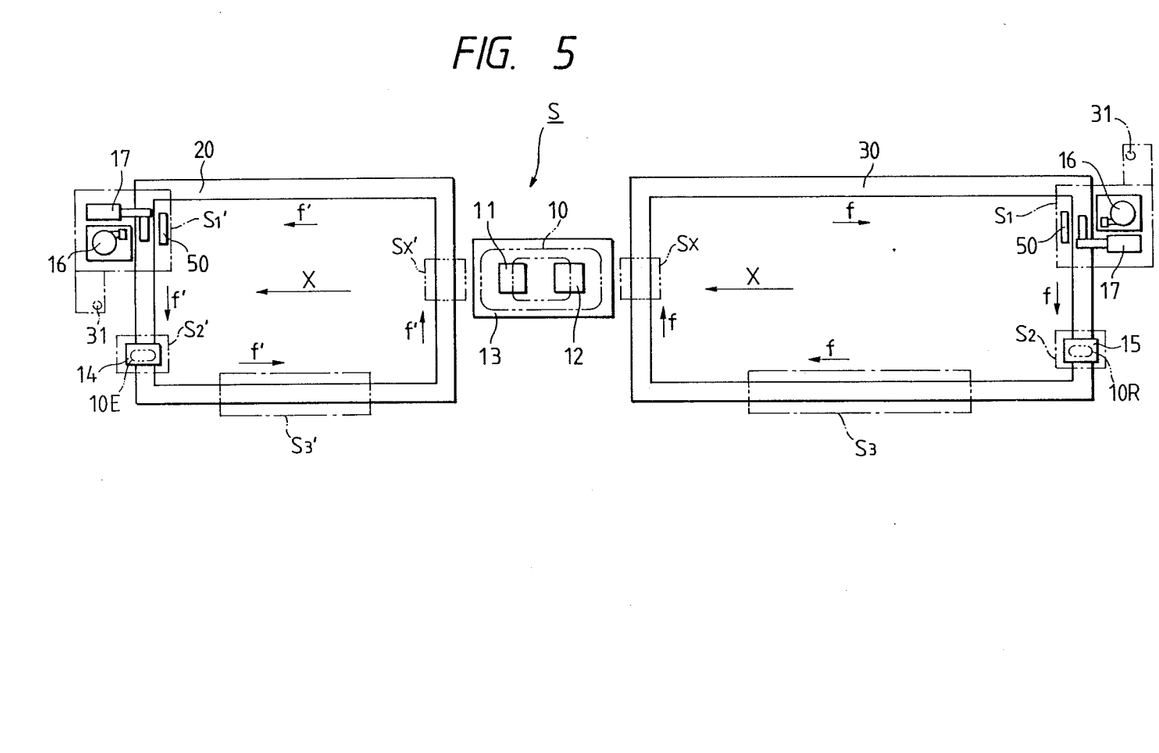
FIG. 5 is a schematic plan view showing a part of a vehicle assembly line in which the embodiment shown in FIG. 1 is employed.
Figure 6:
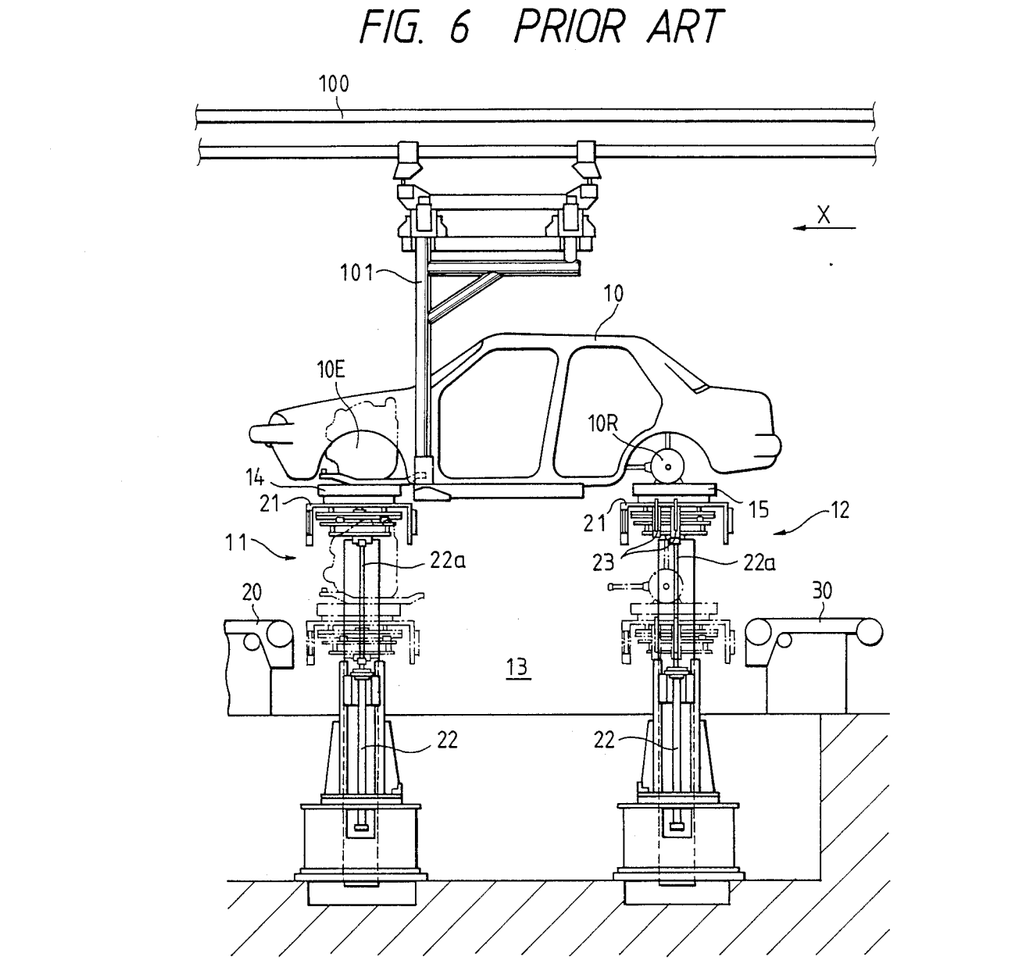
FIG. 6 is a schematic side view showing a mounting station provided in the vehicle assembly line shown in FIG. 5.

FIGS. 1 and 2 show an example of the apparatus for successive supply of parts according to the present invention, which is operative to supply successively bolts B used as clamping parts, and FIGS. 5 and 6 show a vehicle assembly line in which a plurality of the examples each shown in FIGS. 1 and 2 are employed.

In the vehicle assembly line shown in FIGS. 5 and 6, a vehicle body 10 (FIG. 6) which is supported by a hanger 101 of a trolley conveyor 100 of the overhead type installed along the vehicle assembly line is transported in a direction indicated by an arrow X (an X direction) and, on the way of transportation, the vehicle body 10 is stopped at a mounting station S so that an engine unit 10E and a rear axle unit 10R are mounted on the vehicle body 10. In the mounting station S, a front lifter 11 for supporting the engine unit 10E and moving the same into an engine mounting portion formed on the vehicle body 10 and a rear lifter 12 for supporting the rear axle unit 10R and moving the same into a rear axle mounting portion formed on the vehicle body 10 are provided independently in a working pit 13 formed in the mounting station S.

In connection with the mounting station S, first and second circular conveying devices 20 and 30 each circulating rectangularly are installed to have respective portions extending to be substantially perpendicular to the X direction and to face each other with the working pit 13 in the mounting station S between. The first circular conveying device 20 conveys the engine unit 10E put on a pallet 14 to a predetermined location corresponding to the front lifter 11 and the second circular conveying device 30 conveys the rear axle unit 10R put on a pallet 15 to a predetermined location corresponding to the rear lifter 12.

Since the first and second circular conveying devices 20 and 30 are constituted similarly to each other, only the second circular conveying device 30 will be explained hereinafter and portions and directions in the first circular conveying device 20 which correspond to those in the second circular conveying device 30 are marked with the same references and primes annexed to the respective references.

Figure 7:
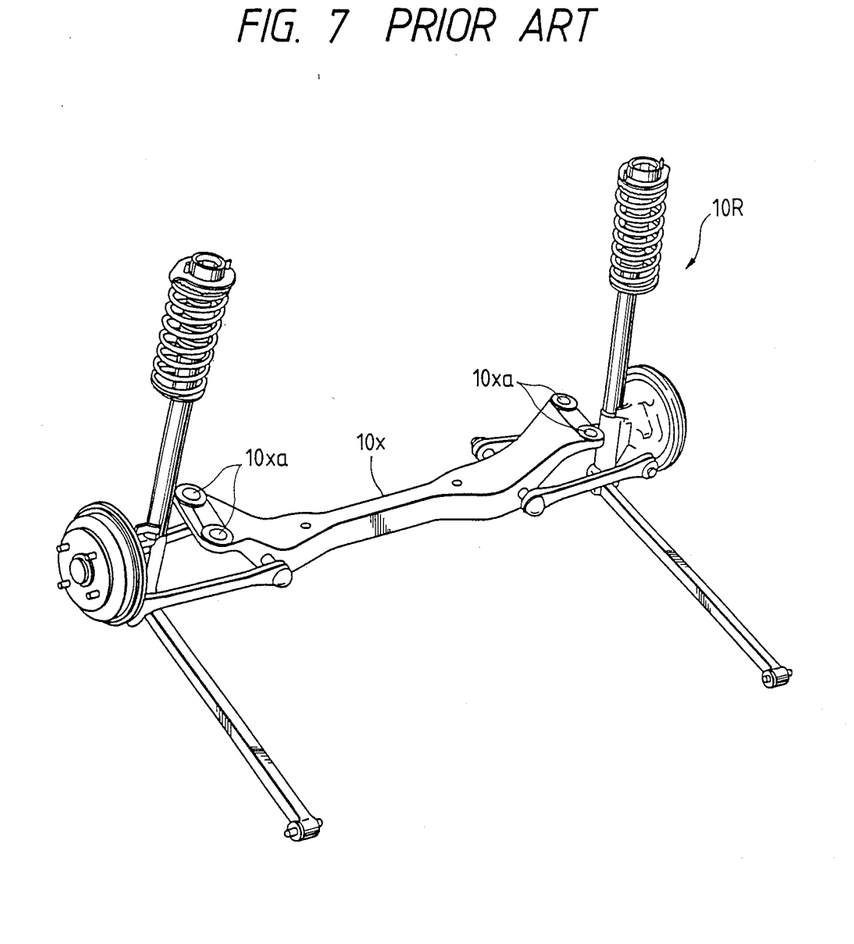
FIG. 7 is a schematic perspective view showing an example of a rear axle unit mounted on a vehicle body at the mounting station shown in FIG. 6.
Figure 8:
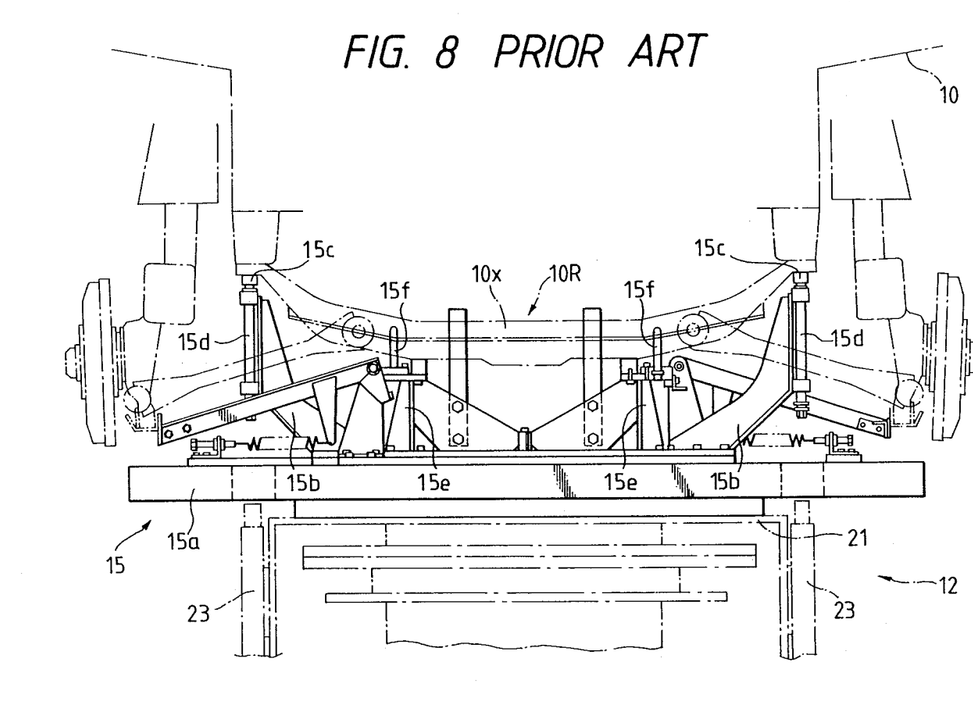
FIG. 8 is a schematic front view used for the explanation of mounting of the rear axle unit on the vehicle body carried out at the mounting station shown in FIG. 5.

In the second circular conveying device 30, the pallet 15 is moved to circulate along directions each indicated by f in FIG. 5. The rear axle unit 10R as shown in FIG. 7, for example, is placed on the pallet 15 and secured to be stationary by a holding mechanism of the pallet 15. As shown in FIG. 8, the holding mechanism provided on the pallet 15 comprises a pair of supporting stands 15e fixed with a predetermined space therebetween on a base plate 15a of the pallet 15 for supporting a cross member 10x of the rear axle unit 10R, and a pair of rotary rods 15d each supported to be rotatable by a bracket 15b fixed on the base plate 15a. Each of the supporting stand 15e is provided with a positioning pin 15f projecting upward to be able to engage with an opening which is formed on the cross member 10x of the rear axle unit 10R to be used for positioning, and each of the rotary rods 15d is provided at its top end with a socket portion 15c and disposed at the outside of the positioning pin 15f. Each of the socket portion 15c projects upward to face an engaging opening 10xa formed on the cross member 10x of the rear axle unit 10R and to hold the bolt B which is used for fixing the cross member 10x to the vehicle body 10. Further, a lower end of each of the rotary rod 15d is positioned to face a top end of a bolt driver 23 which is attached to the rear lifter 12.

The second circular conveying device 30 is provided with a clamping parts supplying station $S_1$, a rear axle unit supplying station $S_2$ and a subassembly station $S_3$ arranged in serial order along the direction of movement of the pallet 15. In the clamping parts supplying station $S_1$, the embodiment of apparatus for successive supply of parts according to the present invention as shown in FIGS. 1 and 2 is employed as a parts feeder 16 for feeding the bolt B to a predetermined position therein and a robot 17 for shifting each of the bolts B fed to the predetermined position by the parts feeder 16 to the pallet 15 is also provided, so that the bolts B are supplied to the pallet 15 on the second circular conveying device 30. Further, a controller 50 for controlling the parts feeder 16 and a warning buzzer 31 for malfunction of the parts feeder 16 are also provided in the clamping parts supplying station $S_1$. In the rear axle unit supplying station $S_2$, the rear axle unit 10R is placed on the pallet 15 to which the bolts B have been supplied, and in the subassembly station $S_3$, various parts are attached to the rear axle unit 10R placed on the pallet 15.

The second circular conveying device 30 is further provided with a loading station Sx in the vicinity of the mounting station S. In the loading station Sx, the pallet 15 on which the rear axle unit 10R is secured is stopped at the location corresponding to the rear lifter 12 in the mounting station S and then the rear axle unit 10R is placed on a rotary mounting table 21 provided at the top of the rear lifter 12 together with the pallet 15 by a loading device (not shown in the drawings) provided in the loading station Sx. The pallet 15 on which the rear axle unit 10R is held is locked at a predetermined location on the rotary mounting table 21 of the rear lifter 12 by a locking member (not shown in the drawings) provided on the rear lifter 12.

The rotary mounting table 21 of the rear lifter 12 is composed of two slidable plate members so disposed that one is superposed upon the other to slide in two directions perpendicular to each other, respectively, and a rotatable plate member disposed on the slidable plate members to be rotated, and is caused to ascend or descend by a lifting cylinder 22 which has a piston rod 22a connecting at its top end with a lower one of the slidable plate members. Further, the bolt drivers 23 are attached to the rotary mounting table 21 for rotating the bolts B supported by the socket portions 15c of the holding mechanism provided on the pallet 15. The top end of the bolt driver 23 is caused to engage with the lower end of the rotary rod 15d of the holding mechanism and to rotate the rotary rod 15d so that the bolt B supported by the socket portion 15c of the holding mechanism is rotated on the occasion of ascending movement of the rotary mounting table 21 caused by the lifting cylinder 22.

When the rotary mounting table 21 provided on the rear lifter 12 is lifted by the lifting cylinder 22, the vehicle body 10 supported by the hanger 101 has been transported by the trolley conveyor 100 into the mounting station S so as to have the rear axle mounting portion thereof positioned above the rear lifter 12. The rear axle unit 10R secured on the pallet 15 which is locked on the rotary mounting table 21 is moved upward into the rear axle mounting portion formed on the vehicle body 10 by the rotary mounting table 21 caused to ascend by the lifting cylinder 22. During the ascending movement of the rotary mounting table 21, the slidable plate members and the rotatable plate member constituting the rotary mounting table 21 are moved to slide or rotate selectively, so that the rear axle unit 10R on the rotary mounting table 21 is lifted along a moving path determined not to interfere with various portions of the vehicle body 10. Then, the rear axle unit 10R which has been moved into the rear axle mounting portion provided on the vehicle body 10 is fixed to the vehicle body 10 by the bolts B each of which is supported by the socket portion 15c of the rotary rod 15d and rotated by the bolt driver 23 engaging with the lower end of the rotary rod 15d to be screwed through the engaging opening 10xa formed on the cross member 10x of the rear axle unit 10R into the vehicle body 10.

The parts feeder 16, which is the embodiment of apparatus for successive supply of parts according to the present invention, comprises a couple of main parts feeding devices 1 and 1' and a couple of auxiliary parts feeding devices 2 and 2' incorporated with the main parts feeding devices 1 and 1', respectively.

The main parts feeding device 1 is provided with a parts shooting portion 1a which is supplied with the bolts B from, for example, a bolt feeding bowl structure (not shown in the drawings) connected with a rear end of the parts shooting portion 1a. The bolts B supplied into the parts shooting portion 1a are arranged to align with their hexagonal heads placed downward and shifted from the rear end to a front end of the parts shooting portion 1a to be fed therefrom to the outside successively.

The auxiliary parts feeding device 2 in provided with a parts storing portion 2a extending in parallel with the parts shooting portion 1a of the main parts feeding device 1 for keeping therein a predetermined number of bolts B, for example ten bolts B, and an extruding portion 2b disposed at an upper end of the parts storing portion 2a and containing a pusher, such as a coil spring or a air cylinder. The bolts B kept in the parts storing portion 2a are arranged to align with their hexagonal heads placed downward and pushed by the pusher contained in the extruding portion 2b toward a lower end of the parts storing portion 2a.

The front end of the parts shooting portion 1a of the main parts feeding device 1 and the front end of the parts storing portion 2a of the auxiliary parts feeding device 2 are placed on a supporting plate 5 to engage with a slidable block member 3 disposed on a guide member 6 which is provided on the supporting plate 5 to extend in a direction substantially perpendicular to the direction along which each of the part shooting portion 1a and the parts storing portion 2a extends. The sliding block member 3 is provided on its upper surface portion with a depression 3a having a rear side opening and a front side slit 3b and being of the size for receiving the hexagonal head of the bolt B, so as to serve as a parts gateway common to the main parts feeding device 1 and the auxiliary parts feeding device 2. Further, the slidable block member 3 is connected through a connecting strip member 3c, which passes through an opening 5a formed on the supporting plate 5, with a piston rod 7a of an air cylinder 7 attached to an under surface of the supporting plate 5. The air cylinder 7 is controlled in its operation by a controller 50 to cause the slidable block member 3 to slide along the guide member 6 so as to place the same at first and second engaging positions selectively. The slidable block member 3 which is placed at the first engaging position engages with the main and auxiliary parts feeding devices 1 and 2 in such a manner that the depression 3a is positioned to face the front end of the parts shooting portion 1a of the main parts feeding device 1 so that one of the bolts B can be fed from the parts shooting portion 1a to the depression 3a through the rear side opening thereof and the front end of the parts storing portion 2a of the auxiliary parts feeding device 2 is walled by a rear side portion of the slidable block member 3, as shown in FIG. 1 and shown with solid lines in FIG. 2. On the other hand, the slidable block member 3 which is placed at the second engaging position engages with the main and auxiliary parts feeding devices 1 and 2 in such a manner that the depression 3a is positioned to face the front end of the parts storing portion 2a of the auxiliary parts feeding device 2 so that one of the bolts B can be fed from the parts storing portion 2a to the depression 3a through the rear side opening thereof and the front end of the parts shooting portion 1a of the main parts feeding device 1 is walled by the rear side portion of the slidable block member 3, as shown with dot-dash lines in FIG. 2.

Further, a bolt sensor 4 attached to a bracket 4a is provided on the support plate 5 to face the front side slit 3b of the depression 3a provided on the slidable block member 3 when the slidable block member 3 is placed at the first engaging position. This bolt sensor 4 is operative to check the bolt feeding condition of the main parts feeding device 1 by detecting, through the front slit 3b of the depression 3a, the bolt B fed to the depression 3a on the slidable block member 3 placed at the first engaging position and to produce a detection output signal Db representing existence or nonexistence of the bolt B in the depression 3a. The detection output signal Db is supplied to the controller 50.

Figure 3:
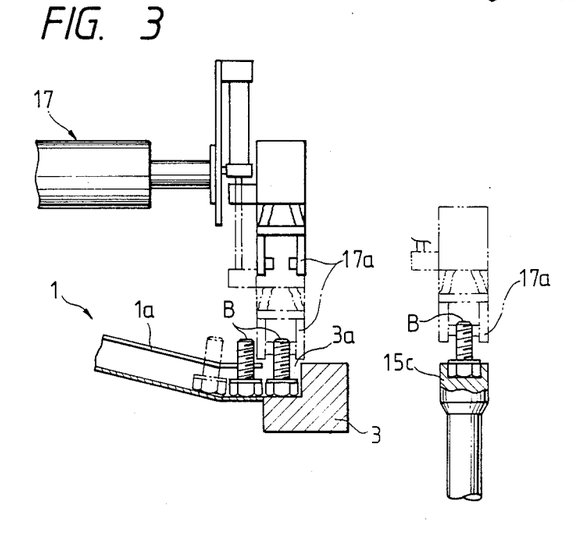
FIG. 3 is an illustration used for explaining the operation of a robot for carrying parts fed by the embodiment shown in FIG. 1 to a predetermined location.

As shown in FIG. 3, the robot 17 is provided at the end of its arm portion with a hand portion 17a for holding the bolt B, and the bolt B fed to the depression 3a on the slidable block member 3 is held by the hand portion 17a of the robot 17 when the slidable block member 3 is placed at the first engaging position and then shifted by the robot 17 to one of the socket portions 15c of the holding mechanism provided on the pallet 15.

The main and auxiliary parts feeding devices 1' and 2' are constituted in the same manner as the main and auxiliary parts feeding devices 1 and 2, respectively, and various portions, members and elements are also provided in connection with the main and auxiliary parts feeding devices 1' and 2' in the same manner as those provided in connection with the main and auxiliary parts feeding devices 1 and 2 as described above. In FIGS. 1 and 2, such portions, members and elements corresponding to those provided in connection with the main and auxiliary parts feeding devices 1 and 2 are marked with the same references and primes annexed to the respective references, and description thereof will be omitted.

The controller 50 to which the detection output signal Db from the bolt sensor 4 and a detection output signal Db' from a bolt sensor 4' are supplied is operative to produce cylinder driving signals Cp and Cp' and a buzzer driving signal Cw based on the detection output signals Db and Db' and to supply the air cylinder 7 and an air cylinder 7' with the cylinder driving signals Cp and Cp', respectively, and the warning buzzer 31 with the buzzer driving signal Cw.

With the configuration described above, when each of the main parts feeding devices 1 and 1' operates properly, the bolts B supplied to the parts shooting portion 1a are fed successively to the depression 3a on the slidable block member 3 placed at the first engaging position to be shifted to one of the socket portions 15c by the robot 17 and similarly the bolts B supplied to a parts shooting portion 1a' are fed successively to a depression 3a' on a slidable block member 3' placed at a position corresponding to the first engaging position to be shifted to the other of the socket portions 15c by the robot 17. During such proper operating condition, the bolt sensors 4 and 4' supply the controller 50 respectively with the detection output signals Db and Db' each representing existence of the bolt B in the depression 3a or 3a', and the controller 50 does not supply the air cylinders 7 and 7' with the cylinder driving signals Cp and Cp' so that the slidable block members 3 and 3' are kept at the first engaging position and the position corresponding to the first engaging position, respectively.

When the main parts feeding device 1 or 1' fails to feed the bolts B to the depression 3a on the slidable block member 3 placed at the first engaging position or the depression 3a' on the slidable block member 3' placed at the position corresponding to the first engaging position due to some cause, the bolt sensor 4 or 4' supplies the detection output signal Db or Db' representing nonexistence of the bolt B in the depression 3a on the slidable block member 3 placed at the first engaging position or the depression 3a' on the slidable block member 3' placed at the position corresponding to the first engaging position. Then, the controller 50 supplies the air cylinder 7 or 7' with the cylinder driving signal Cp or Cp' of, for example, the positive polarity and thereby the air cylinder 7 or 7' operates to move the slidable block member 3 or 3' along the guide member 6 or 6' in a direction indicated by an arrow ST or ST' in FIG. 2 into the second engaging position or a position corresponding to the second engaging position. Therefore, one of the bolts B kept in the parts storing portion 2a or 2a' is fed to the depression 3a on the slidable block member 3 placed at the second engaging position or the depression 3a' on the slidable block member 3' placed at the position corresponding to the second engaging position. On such an occasion, the controller supplies also the warning buzzer 31 with the buzzer driving signal Cw and thereby the warning buzzer 31 starts working.

After that, the controller 50 supplies the air cylinder 7 or 7' with the cylinder driving signal Cp or Cp' of, for example, the negative polarity following the cylinder driving signal Cp or Cp' of the negative polarity and thereby the air cylinder 7 or 7' operates to return the slidable block members 3 or 3' to the first engaging position or the position corresponding to the first engaging position. Consequently, the bolt sensors 4 and 4' supply the controller 50 respectively with the detection output signals Db and Db' each representing existence of the bolt B in the depression 3a or 3a', and the controller 50 stops to supply the air cylinder 7 or 7' with the cylinder driving signal Cp or Cp' . Then, the bolt B put in the depression 3a on the slidable block member 3 placed at the first engaging position is shifted to one of the socket portions 15c by the robot 17 and similarly the bolt B put in the depression 3a' on the slidable block member 3' placed at the position corresponding to the first engaging position is shifted to the other of the socket portions 15c by the robot 17. Such operation as described above is repeated until the main parts feeding device 1 or 1' recovers from failure of feeding the bolts B to the depression 3a on the slidable block member 3 placed at the first engaging position or the depression 3a' on the slidable block member 3' placed at the position corresponding to the first engaging position, so that the bolts B are supplied to the socket portions 15c successively. When the main parts feeding device 1 or 1' recovers from failure of feeding the bolts B, the controller 50 stops to supply the warning buzzer 31 with the buzzer driving signal Cw and thereby the warning buzzer 31 is caused to be inoperative.

The controller 50 may be composed of a microcomputer. One example of an operation program of such a microcomputer for controlling the air cylinders 7 and 7' and the warning buzzer 31 is carried out in accordance with a flow chart shown in FIG. 4.

Figure 4:
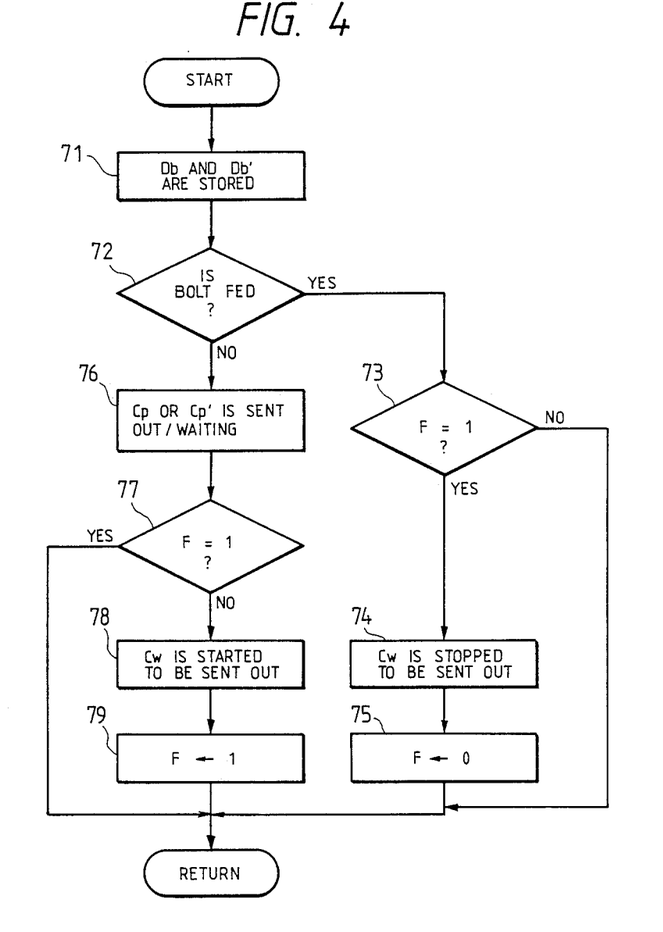
FIG. 4 is a flow chart used for explanation of the operation of the embodiment shown in FIG. 1.

In the operation program according to the flow chart shown in FIG. 4, first, in process 71, the detection output signals Db and Db' from the bolt sensors 4 and 4' are stored. Then, in decision 72, it is checked based on the detection output signal Db whether one of the bolts B supplied to the parts shooting portion 1a is fed to the depression 3a on the slidable block member 3 placed at the first engaging position or not and it is also checked based on the detection output signal Db' whether one of the bolts B supplied to the parts shooting portion 1a' is fed to the depression 3a' on the slidable block member 3' placed at the position corresponding to the first engaging position or not.

When it is clarified in the decision 72 that the bolts B from the parts shooting portions 1a and 1a'are fed respectively to the depressions 3a and 3a', it is checked whether a flag F is equal to 1 or not in decision 73. If the flag F is not equal to 1, the step returns to process 71, and if the flag F is equal to 1, the buzzer driving signal Cw is stopped to be sent out in the process 74 and the flag F is set to be 0 in process 75, then the step returns to the process 71.

To the contrary, when it is clarified in the decision 72 that the bolt B from the parts shooting portions 1a is not fed to the depression 3a or the bolt B from the parts shooting portion 1a' is not fed to the depression 3a', the cylinder driving signal Cp or Cp' which has both the positive and negative polarities successively is sent out to the air cylinder 7 or 7' and the step is kept waiting for a predetermined period of time necessary for the reciprocating movement of the slidable block member 3 or 3' in process 76.

After that, it is checked whether the flag F is equal to 1 or not in decision 77. If the flag F is equal to 1, the step returns to the process 71, and if the flag F is not equal to 1, the buzzer driving signal Cw is started to be sent out in process 78 and the flag F is set to be 1 in process 79, then the step returns to the process 71.

Figure 9:
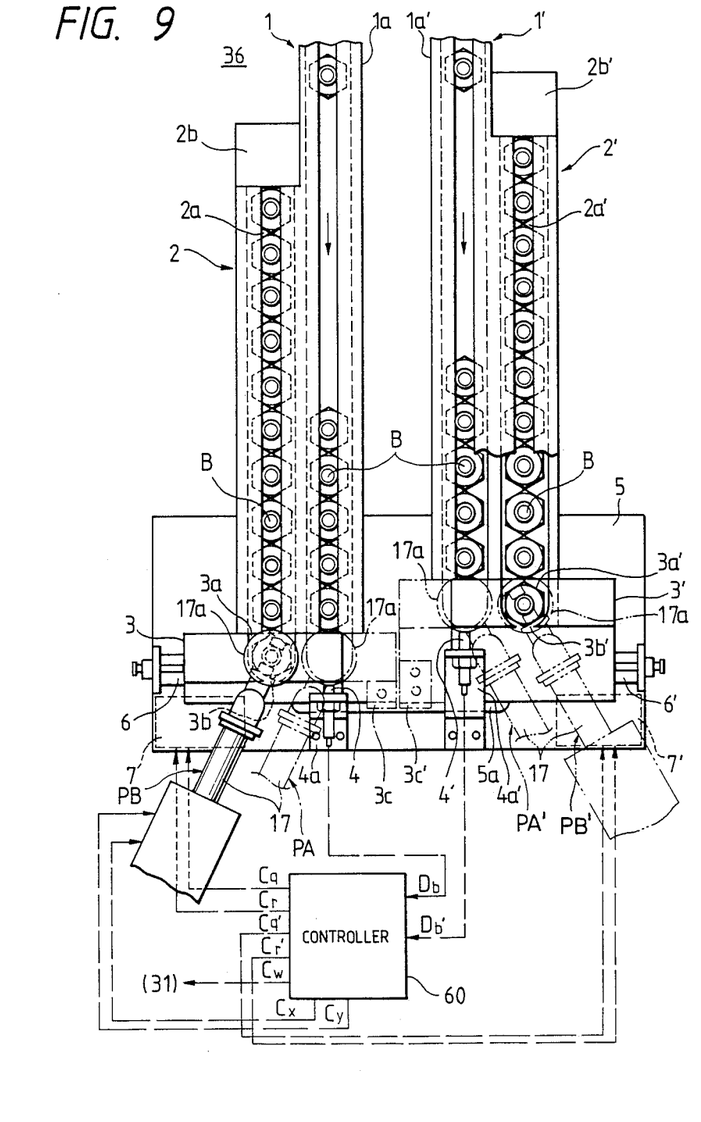
FIG. 9 is a schematic plan view showing another embodiment of apparatus for successive supply of parts according to the present invention.

FIG. 9 shows another embodiment of apparatus for successive supply of parts according to the present invention.

The embodiment shown in FIG. 9 is constituted to be a parts feeder 36 used, in place of the parts feeder 16 shown in FIGS. 1 and 2, in the clamping parts supplying station S₁ provided in the second circular conveying device 30 described above for feeding the bolts B similarly to the parts feeder 16. In FIG. 9, portions, members and elements corresponding to those of FIG. 2 are marked with the same references and further description thereof will be omitted.

The embodiment shown in FIG. 9 is provided with a controller 60 for controlling air cylinders 7 and 7', the warning buzzer 31 and the robot 17. The controller 60 is supplied with a detection output signal Db from a bolt sensor 4 and a detection output signal Db' from a bolt sensor 4' and operative to produce cylinder driving signals Cq, Cr, Cq' and Cr', a buzzer driving signal Cw and robot control signals Cx and Cy based on the detection output signals Db and Db' and to supply the air cylinder 7 with the cylinder driving signals Cq and Cr selectively, the air cylinder 7' with the cylinder driving signals Cq' and Cr' selectively, the warning buzzer 31 with the buzzer driving signal Cw, and the robot 17 with the robot control signals Cx and Cy selectively.

With such a configuration, when each of main parts feeding devices 1 and 1' operates properly, the bolts B supplied to a parts shooting portion 1a are fed successively to a depression 3a on a slidable block member 3 placed at a first engaging position, as shown with dot-dash lines in FIG. 9, to be shifted to one of the socket portions 15c by the robot 17 which is so positioned as to have its hand portion 17a reaching a position above the depression 3a as indicated by PA in FIG. 9 and similarly the bolts B supplied to a parts shooting portion 1a' are fed successively to a depression 3a' on a slidable block member 3' placed at a position corresponding to the first engaging position, as shown with dot-dash lines in FIG. 9, to be shifted to the other of the socket portions 15c by the robot 17 which is so positioned as to have its hand portion 17a reaching a position above the depression 3a' as indicated by PA' in FIG. 9. During such proper operating condition, the bolt sensors 4 and 4' supply the controller 60 respectively with the detection output signals Db and Db' each representing existence of the bolt B in the depression 3a or 3a' and, at the beginning of the operating condition, the controller 60 supplies the air cylinders 7 and 7' with the cylinder driving signals Cr and Cr', respectively, so as to place the slidable block members 3 and 3' at the first engaging position and the position corresponding to the first engaging position, respectively, and further supplies the robot 17 with the robot control signal Cx so as to cause the robot 17 to take repeatedly the positions indicated by PA and PA' selectively.

When the main parts feeding device 1 or 1' fails to feed the bolts B to the depression 3a on the slidable block member 3 placed at the first engaging position or the depression 3a' on the slidable block member 3' placed at the position corresponding to the first engaging position due to some cause, the bolt sensor 4 or 4' supplies the detection output signal Db or Db' representing nonexistence of the bolt B in the depression 3a on the slidable block member 3 placed at the first engaging position or the depression 3a' on the slidable block member 3' placed at the position corresponding to the first engaging position. Then, the controller 60 supplies the air cylinder 7 or 7' with the cylinder driving signal Cq or Cq' and thereby the air cylinder 7 or 7' operates to move the slidable block member 3 or 3'along the guide member 6 or 6' into a second engaging position or a position corresponding to the second engaging position as shown with solid lines in FIG. 9. Therefore, one of the bolts B kept in parts storing portion 2a or 2a' is fed to the depression 3a on the slidable block member 3 placed at the second engaging position or the depression 3a' on the slidable block member 3' placed at the position corresponding to the second engaging position. The controller 60 supplies also the robot 17 with the robot control signal Cy to cause the robot 17 to be so positioned as to have its hand portion 17a reaching a position above the depression 3a as indicated by PB in FIG. 9 or to cause the robot 17 to be so positioned as to have its hand portion 17a reaching a position above the depression 3a' as indicated by PB' in FIG. 9. On such an occasion, the controller 60 supplies further the warning buzzer 31 with the buzzer driving signal Cw and thereby the warning buzzer 31 starts working.

Then, the bolt B put in the depression 3a on the slidable block member 3 placed at the second engaging position is shifted to one of the socket portions 15c by the robot 17 taking the position indicated by PB in FIG. 9 or the bolt B put in the depression 3a' on the slidable block member 3' placed at the position corresponding to the second engaging position is shifted to the other of the socket portions 15c by the robot 17 taking the position indicated by PB' in FIG. 9. After that, the controller 60 supplies the air cylinders 7 and 7' with the cylinder driving signals Cr and Cr', respectively, to return the slidable block members 3 and 3' to the first engaging position and the position corresponding to the first engaging position, respectively, and further supplies the robot 17 with the robot control signal Cx to cause the robot 17 to be able to take the positions indicated by PA and PA' selectively.

Such operation as described above is repeated until the main parts feeding device 1 or 1' recovers from failure of feeding the bolts B to the depression 3a on the slidable block member 3 placed at the first engaging position or the depression 3a' on the slidable block member 3' placed at the position corresponding to the first engaging position, so that the bolts B are supplied to the socket portions 15c successively. When the main parts feeding device 1 or 1' recovers from failure of feeding the bolts B, the controller 60 stops to supply the warning buzzer 31 with the buzzer driving signal Cw and thereby the warning buzzer 31 is caused to be inoperative.

The controller 60 also may be composed of a microcomputer. One example of an operation program of such a microcomputer for controlling the air cylinders 7 and 7', the robot 17 and the warning buzzer 31 is carried out in accordance with a flow chart shown in FIG. 10.

Figure 10:
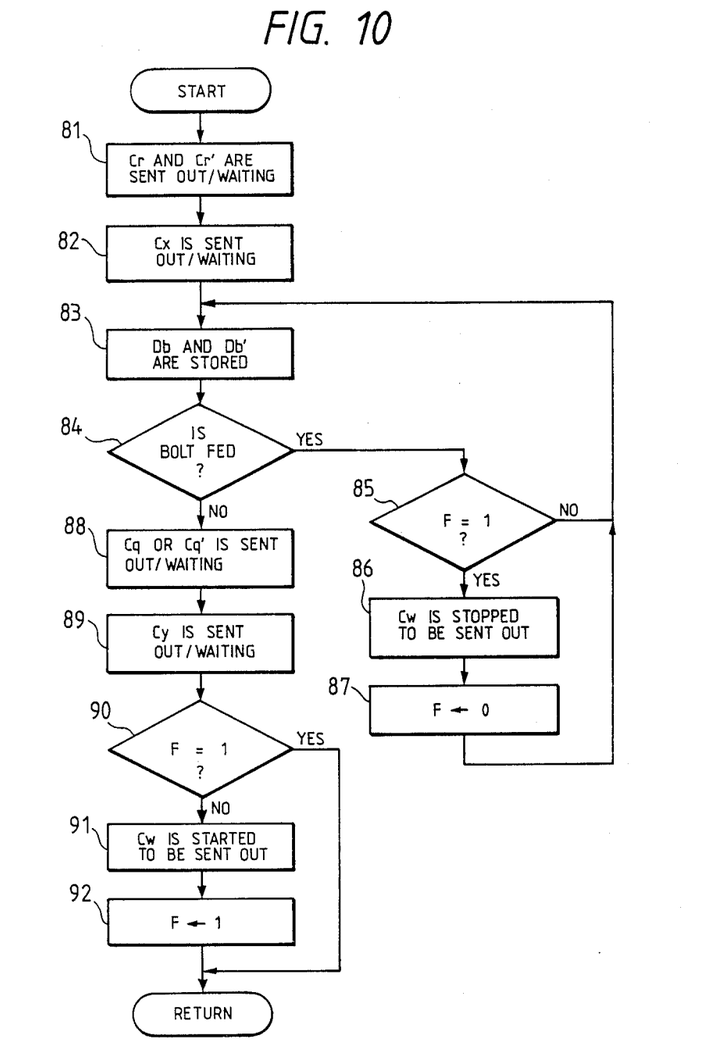
FIG. 10 is a flow chart used for explanation of the operation of the embodiment shown in FIG. 9.

In the operation program according to the flow chart shown in FIG. 10, first, in process 81, the cylinder driving signals Cr and Cr' are sent out to the air cylinders 7 and 7' and the step is kept waiting for a predetermined period of time necessary for the slidable block members 3 and 3' to move into the first engaging position and the position corresponding to the first engaging position, respectively. Next, in process 82, the robot control signal Cx is sent out to the robot 17 and the step is kept waiting for a predetermined period of time necessary for the robot 17 to be so located as to be able to take selectively the positions indicated by PA and PA' in FIG. 9.

After that, in process 83, the detection output signals Db and Db' from the bolt sensors 4 and 4' are stored. Then, in decision 84, it is checked based on the detection output signal Db whether one of the bolts B supplied to the parts shooting portion 1a is fed to the depression 3a on the slidable block member 3 placed at the first engaging position or not and it is also checked based on the detection output signal Db' whether one of the bolts B supplied to the parts shooting portion 1a' is fed to the depression 3a'on the slidable block member 3' placed at the position corresponding to the first engaging position or not.

When it is clarified in the decision 84 that the bolts B from the parts shooting portions 1a and 1a' are fed respectively to the depressions 3a and 3a', it is checked whether a flag F is equal to 1 or not in decision 85. If the flag F is not equal to 1, the step returns to the process 83, and if the flag F is equal to 1, the buzzer driving signal Cw is stopped to be sent out in process 86 and the flag F is set to be 0 in process 87, then the step returns to the process 83.

To the contrary, when it is clarified in the decision 84 that the bolt B from the parts shooting portions 1a is not fed to the depression 3a or the bolt B from the parts shooting portion 1a' is not fed to the depression 3a', the cylinder driving signal Cq or Cq' is sent out to the air cylinder 7 or 7' and the step is kept waiting for a predetermined period of time necessary for the slidable block member 3 or 3' to move into the second engaging position or the position corresponding to the second engaging position in process 88. Then, in process 89, the robot control signal Cy is sent out to the robot 17 and the step is kept waiting for a predetermined period of time necessary for the robot 17 to be caused to take the position indicated by PB or PB' in FIG. 9.

After that, it is checked whether the flag F is equal to 1 or not in decision 90. If the flag F is equal to 1, the step returns to the process 81, and if the flag F is not equal to 1, the buzzer driving signal Cw is started to be sent out in process 91 and the flag F is set to be 1 in process 92, then the step returns to the process 81.

Although each of the embodiments described above with reference to the accompanying drawings is constituted to be the parts feeder for feeding the bolts used as clamping parts to the vehicle assembly line, it is to be understood that the present invention is not limited thereto, and the apparatus according to the present invention may be arranged for feeding successively various kinds of parts other than the bolts mentioned above without departing from the scope as defined in the appended claims.

What is claimed is:

1. An apparatus for successively supplying parts comprising:
   a main parts feeding means having a parts shooting portion and operative to feed parts successively from one end of said parts shooting portion,
   an auxiliary parts feeding means having a parts storing portion and operative to supply parts stored in said parts storing portion from one end of said parts storing portion in a selected situation,
   checking means for checking a parts feeding condition of said main parts feeding means,
   movable means provided thereon with a parts receiving portion and disposed to engage with said one end of said parts shooting portion and said one end of said parts storing portion,
   driving means for moving said movable means to control a position of said parts receiving portion,
   operation control means operative to cause said driving means to keep said movable means at a first position for receiving one of the parts fed from said one end of said parts shooting portion successively by said parts receiving portion and preventing said parts storing portion from supplying the parts stored therein by a portion of said movable means when said checking means detects that said main parts feeding means operates properly and to cause said driving means to move said movable means from said first position to a second position for causing said parts storing portion to supply one of the parts stored therein to said parts receiving portion when said checking means detects that said main parts feeding means fails to feed the parts from said one end of said parts shooting portion.

2. An apparatus according to claim 1, wherein said parts shooting portion extending toward the first position and containing the parts which are oriented and arranged to align to be fed from said one end of said parts shooting portion to said first position.

3. An apparatus according to claim 2, wherein said parts storing portion of the auxiliary parts feeding means extends substantially parallel with the parts shooting portion and contains the parts which are oriented and arranged to align to be directed to said one end of the parts storing portion.

4. An apparatus according to claim 1, wherein said operation control means is connected to a warning device for causing said warning device to work when the checking means detects that the main parts feeding means fails to feed the parts to said first position.

5. An apparatus according to claim 1, wherein said movable means is operative to supply a parts transferring device provided in relation to a product assembly line with the parts received from the main parts feeding means and the auxiliary parts feeding means.

6. An apparatus according to claim 5, wherein said parts transferring device comprises a robot for shifting the parts supplied from the movable means to the product assembly line and said operation control device is further operative to control said robot to hold one of the parts from the main parts feeding means at a position corresponding to the parts receiving portion on the movable means placed at the first position and to hold also one of the parts from the auxiliary parts feeding means at a position corresponding to the parts receiving portion on the movable means placed at the second position.

7. An apparatus according to claim 6, wherein said operation control means is connected to a warning device for causing said warning device to work when the checking means detects that the main parts feeding means fails to feed the parts to said first position.

* * * * *